United States Patent
Fulton et al.

(10) Patent No.: US 10,486,905 B1
(45) Date of Patent: Nov. 26, 2019

(54) SYSTEM FOR LOADING AND UNLOADING AN AIRPLANE

(71) Applicant: Ramper Innovations LLC, Riggins, ID (US)

(72) Inventors: Tim J. Fulton, Riggins, ID (US);
Tasche L. Streib, Boise, ID (US); John A. Laz, Boise, ID (US); David Moulin, Boise, ID (US)

(73) Assignee: Ramper Innovations, Inc., Sitka, AK (US)

( * ) Notice: Subject to any disclaimer, the term of this patent is extended or adjusted under 35 U.S.C. 154(b) by 0 days.

(21) Appl. No.: 15/914,453

(22) Filed: Mar. 7, 2018

Related U.S. Application Data

(60) Provisional application No. 62/469,065, filed on Mar. 9, 2017.

(51) Int. Cl.

| | |
|---|---|
| *B65G 15/24* | (2006.01) |
| *B65G 21/14* | (2006.01) |
| *B65G 23/44* | (2006.01) |
| *B65G 43/02* | (2006.01) |
| *B65G 23/04* | (2006.01) |
| *B64F 1/36* | (2017.01) |

(52) U.S. Cl.
CPC .............. *B65G 15/24* (2013.01); *B64F 1/368* (2013.01); *B65G 21/14* (2013.01); *B65G 23/04* (2013.01); *B65G 23/44* (2013.01); *B65G 43/02* (2013.01); *B65G 2201/0264* (2013.01); *B65G 2203/047* (2013.01); *B65G 2207/40* (2013.01); *B65G 2812/02148* (2013.01)

(58) Field of Classification Search
None
See application file for complete search history.

(56) References Cited

U.S. PATENT DOCUMENTS

| | | | | |
|---|---|---|---|---|
| 4,230,044 A | * | 10/1980 | Rohrig | B64F 1/32 104/135 |
| 5,636,728 A | * | 6/1997 | Best | B65G 13/12 193/35 TE |
| 7,337,895 B2 | * | 3/2008 | De Maeyer | A47F 10/06 198/583 |

FOREIGN PATENT DOCUMENTS

JP 2000159323 A * 6/2000

* cited by examiner

*Primary Examiner* — Kavel Singh
(74) *Attorney, Agent, or Firm* — Hawley Torxell Ennis & Hawley LLP; Philip McKay

(57) ABSTRACT

A foldable conveyer system is disclosed appropriate for loading and unloading an airplane using two people. In one embodiment, the foldable conveyer system is formed of a plurality of foldable sections, where each section has a first half and a second half foldably connected to each other. Each first half and each second half has reversible tension-controlled conveyer belts for moving luggage into or out of an aircraft. When fully deployed, and thus operating flat along the interior of an aircraft, the foldable conveyer system operates to move luggage and other objects placed on the foldable conveyer system in a selected direction.

18 Claims, 6 Drawing Sheets

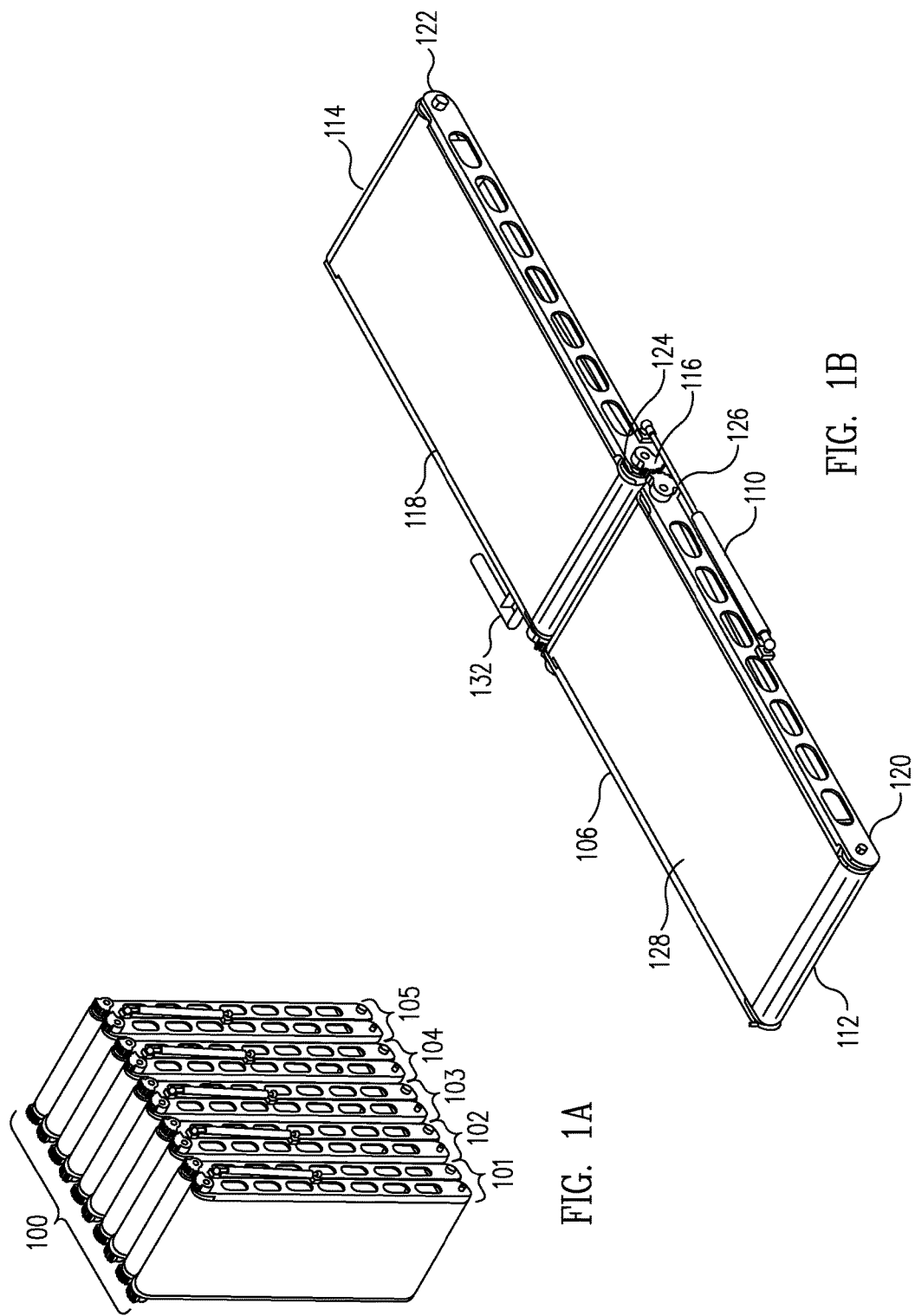

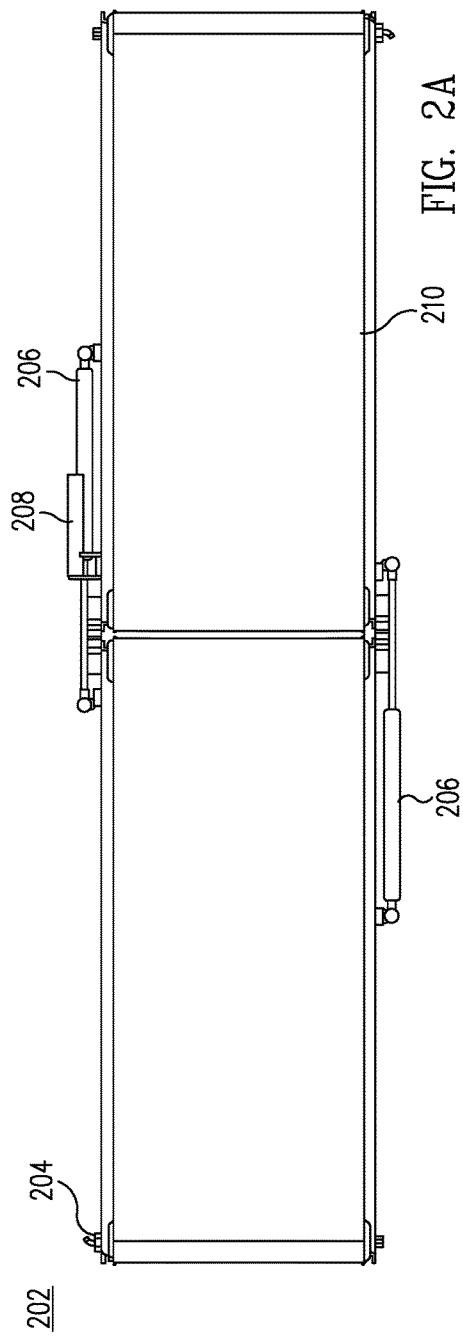
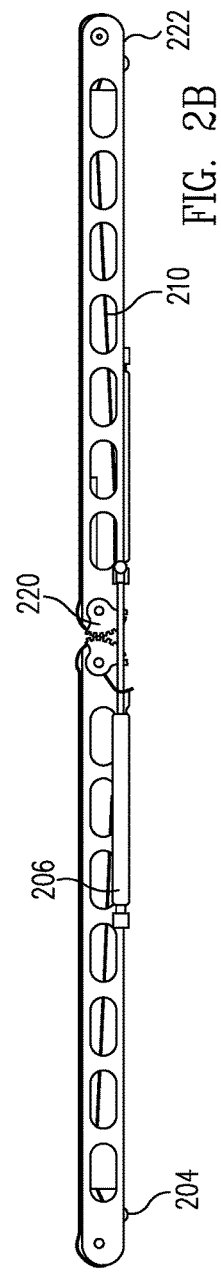
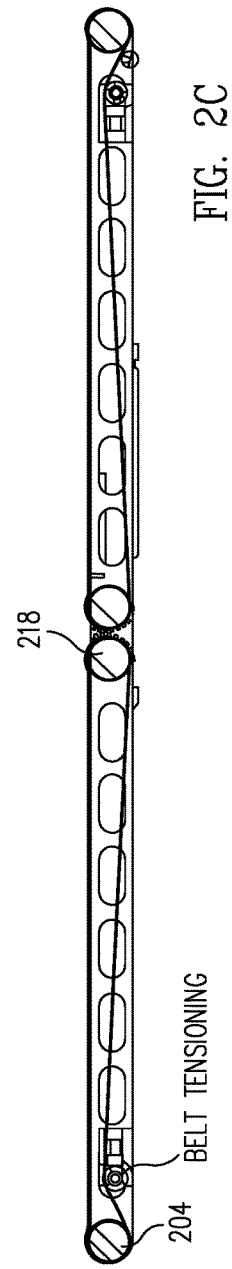

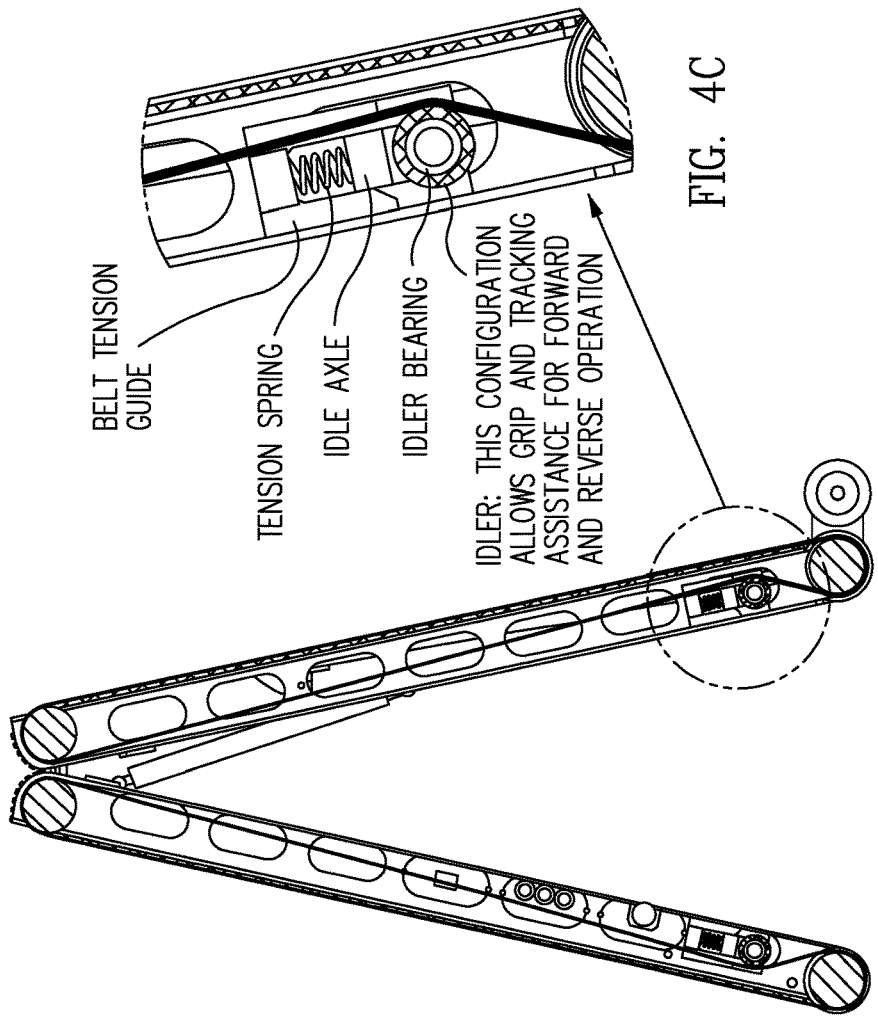
FIG. 4C
FIG. 4B
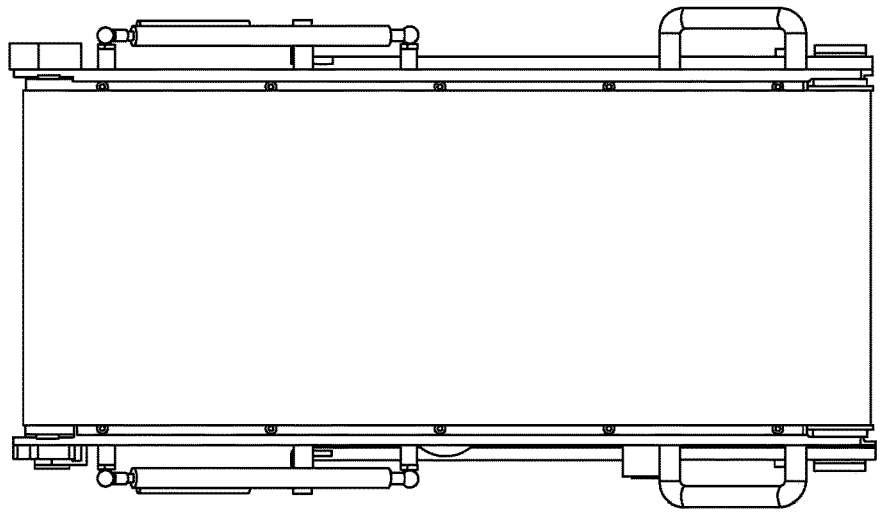
FIG. 4A

SYSTEM FOR LOADING AND UNLOADING AN AIRPLANE

RELATED APPLICATIONS

This application claims the benefit of Fulton, et al., U.S. Provisional Patent Application No. 62/469,065 (RMPR001-PROV), filed on Mar. 9, 2017, entitled "SYSTEM FOR LOADING AND UNLOADING AN AIRPLANE," which is hereby incorporated by reference in its entirety as if it were fully set forth herein.

BACKGROUND

Airlines carry more than a million passengers each day. Most passengers have luggage they need to bring with them from their place of origin to their destination. Since the luggage travels on the same aircraft as the passenger, the luggage first must be checked in with a gate agent of the airline. The gate agent then sends the luggage into a secure area where the luggage is screened and sent through a series of conveyor belts and other mechanisms and eventually arrives at the aircraft belly door. At this point, the luggage is loaded onto the aircraft. After the aircraft arrives at its destination, the luggage is unloaded from the aircraft into another secure area, then delivered to a common area so the passenger may locate and retrieve the luggage. Typically, loading and unloading an aircraft is accomplished by Ramp Agents staging themselves inside the cramped belly of an aircraft, often at opposite ends, possibly including one or more people positioned at an intermediate point within the aircraft. The Ramp Agents load and unload the baggage by carrying or throwing the items.

While this process is occurring for a given aircraft at a given airport, the same process is going on for many other aircraft at the same airport. Furthermore, the same process will go on daily for thousands of other aircraft at other airports and in the air. Airlines and airports spend millions of dollars each year utilizing efficient means to move luggage. These efforts toward efficiency all stop when the bag reaches the belly door.

Although current processes have been effective from a logistical standpoint, they are slow and often cause a great deal of injury to baggage handlers and others involved with the process. Airlines spend huge amounts of money on injury-related costs due to Ramp Agents sustaining injuries on the job. Additionally, those Ramp Agents often end up with lifelong pain and suffering, due to the nature of the work involved. Moreover, airlines spend massive amounts of money for damage to luggage, damage to aircraft and lost efficiencies.

For these reasons, it would be beneficial to have a different process and/or system for loading and unloading luggage from the bellies of airplanes.

SUMMARY

Embodiments discussed herein disclose a foldable conveyer system appropriate for loading and unloading aircraft bellies using one or more people. In one embodiment, the foldable conveyer system is formed of a plurality of foldable sections, where each section has a first half and a second half, with the first and second halves being foldably connected to each other with mechanisms in place to assist with the folding and unfolding. Each first half and each second half has individual, coordinated, reversible tension-controlled conveyer belts for moving luggage into or out of an aircraft where the direction of each conveyer belt is controlled by direction-controlling switches located on one or more of the foldable sections at either end of the foldable conveyer system. When fully deployed, and thus when operating flat or relatively flat along the interior of an aircraft belly, the foldable conveyer system operates to move luggage and other objects placed on the foldable conveyer system in a direction associated with a most recent selection of the direction-controlling switches. However, for sections that are in a partially deployed state or when a given section is folded, one or more limit switches prevent the conveyer belts for that partially deployed or folded section from getting power. Thus, in those conditions, conveyer belts associated with that partially deployed or folded section are unable to move, ensuring operator safety. The gearing required for stability during folding/unfolding has moving guard covers to eliminate pinch points.

BRIEF DESCRIPTION OF THE DRAWINGS

FIGS. 1A and 1B are system diagrams showing a folded conveyer system and a deployed section, in accordance with one embodiment.

FIG. 2A is a section diagram top view, in accordance with one embodiment.

FIG. 2B is a section diagram side view, in accordance with one embodiment.

FIG. 2C is a section diagram cutaway view, in accordance with one embodiment.

FIG. 4A is a view of a partially folded section, in accordance with one embodiment.

FIG. 4B is a side cutaway view, in accordance with one embodiment.

FIG. 4C is a detail view of a subset of FIG. 4B.

Figures 3A, 3B:
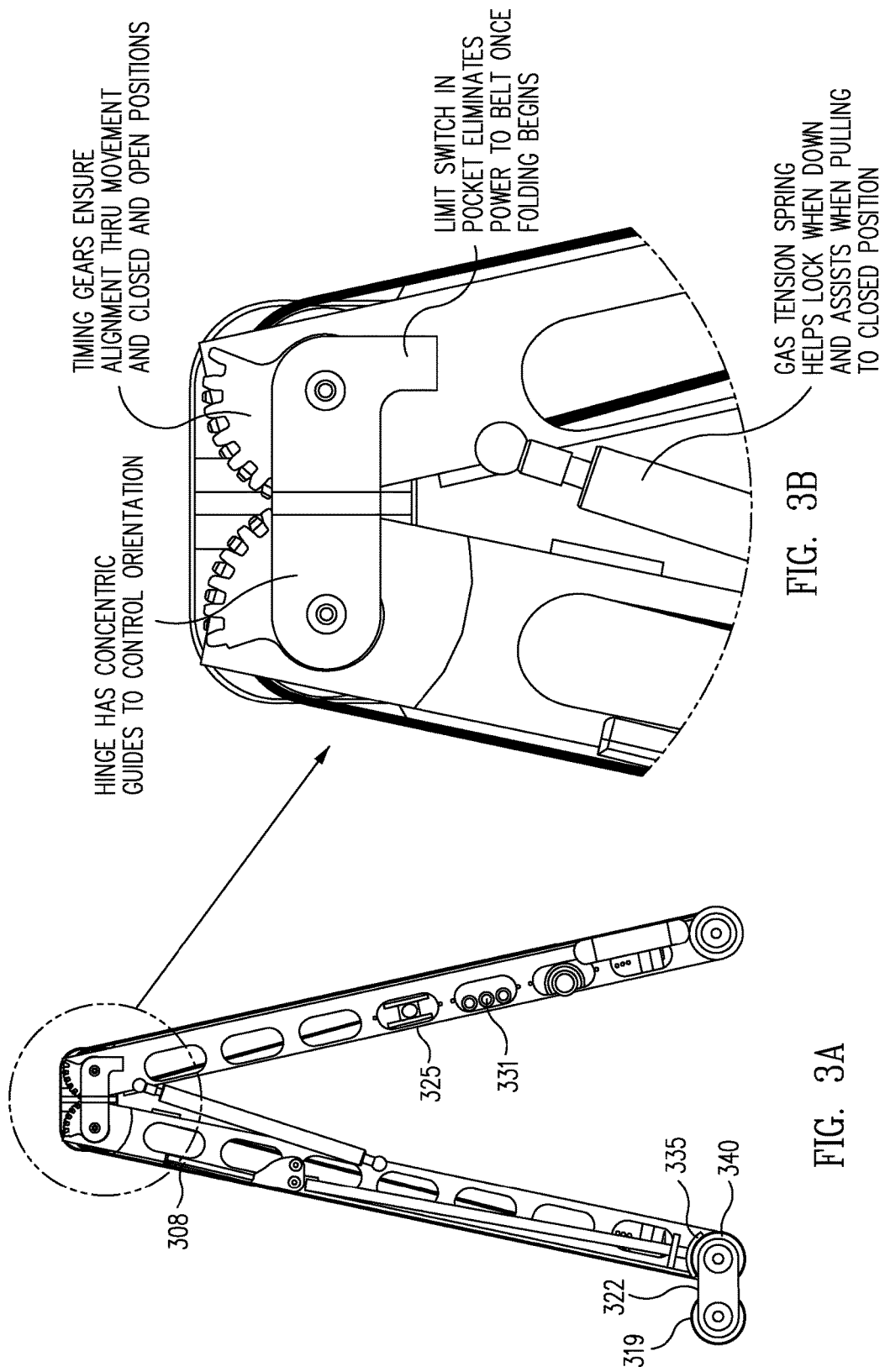
FIG. 3A is a partially deployed section, in accordance with one embodiment.
FIG. 3B is a detail view of a portion of FIG. 3A, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Although embodiments of some features may be reflected in drawings presented herein as externally mounted or as extrusions, persons of ordinary skill will readily recognize that embodiments are contemplated that include, for example, mounting tension gas springs, the timing gears, handles, and other items internally to the frame so that the tension gas spring and other items present less of a possibility for snagging on portions of the external environment.

FIGS. 1A and 1B are system diagrams showing a folded conveyer system and a deployed section, in accordance with one embodiment.

FIG. 1A includes conveyer system 100 which includes sections 101, 102, 103, 104, and 105. FIG. 1B is a representative section 106, which could be any of sections 101, 102, 103, 104, and 105 of FIG. 1A, is shown in a deployed configuration. Note that each section is relatively rectangular, and conveyer belts traverse each half of each section from side to side, with rollers at each end of each half-section. Alternatively, only one half-section of each section has a conveyer belt. In one embodiment, a half section not having a conveyer belt has low friction rollers configured to assist in the moving of the luggage from one side of that half section to the other side of that half-section.

In one embodiment, a lower portion of each half section, e.g. a portion of the half section closest to and optionally touching the floor of the aircraft when each section is fully deployed for use, is enclosed in high density plastic to minimize any friction occurring when the section is being folded, unfolded, or moved.

Tension gas spring 110 (FIG. 1B) is affixed to both the left half 112 and right half 114 of section 106 and is configured to present the most tension when tension gas spring 110 is extended, such as in the deployed configuration of the associated section, and is configured to present the least tension when a section is in a folded configuration. Thus, when tension gas spring 110 is extended, in a deployed condition of a section, tension gas spring 110 assists in folding the section, when the appropriate handle is operated by an operator of the section.

Timing gear 116 ensures that proper orientation is maintained between left half 112 and right half 114 when the individual folding section is in any configuration other than fully deployed. For example, timing gear 116 ensures that proper orientation is maintained between left half 112 and right half 114 when the individual folding section is partially deployed, so that the individual folding section can stand up, such as in an inverted V configuration similar to that seen in FIG. 3.

Conveyer belt 118 (FIG. 1B) rotates over rollers 122 and 124, and conveyer belt 128 rotates over rollers 120 and 126. In one embodiment, each section, such as section 106, 106 has a powered roller for left half 112 and a powered roller for right half 114, each powered roller powering the movement of respective conveyer belts 118 and 128 according to direction-controlling switches discussed herein. Power is supplied by a battery or other power source located within one or more of the sections and supplied through one or more wire harnesses and switches, such as direction-controlling switches and power switches discussed herein.

In one embodiment, a section optionally has a conveyer belt and at least one powered roller on one half section or the other, but not on both half-sections of a given section. In one embodiment, on a half section that doesn't have a conveyer belt and powered roller, minimal friction rollers are provided in a configuration that facilitates items rolling over the minimal friction rollers from one end, e.g. a first end, of the half-section to a different end, e.g. a second end, of the same half-section.

Lift handle 132 is used when deploying or folding a given associated section, such as section 106. Other lift handles are used in other locations of a given section, depending on a particular implementation of the invention. Handles may be mounted on a slidable mount to allow for out of the way storage when not needed, or can be pulled out and locked into place when needed to fold, unfold, and move a given section.

FIG. 2A is a section diagram top view, in accordance with one embodiment.

Referring to FIG. 2A, in various embodiments, section 202 includes, in one embodiment, powered roller 204, the power to which is controlled by one or more switches (not shown) which control power and direction of movement of conveyer belt 210. Section 202 further includes, in various embodiments, one or more of tension gas spring 206 and lift handle 208. Lift handle 208 is used when deploying or folding a section, such as section 202. Tension gas spring 206 is affixed to section 202 and is configured to present the most tension when tension gas spring 206 is extended, such as in a deployed configuration of a section, such as section 202, and is configured to present the least tension when a section is folded (such as seen in FIG. 1A).

FIG. 2B is a section diagram side view, in accordance with one embodiment. Referring to FIG. 2B, of note, in one embodiment, roller 204 is powered, while roller 218 (hidden behind timing gear 220) is not. Thus, roller 218 is an idler roller, and turns the correct direction based on how power is applied to roller 204 according to a selection associated with direction-controlling switches that may be present on this section or an adjacent section, or a section positioned at one or more ends of conveyer system 100 (FIG. 1). Correspondingly, roller 222 (FIG. 2B) is also powered.

FIG. 2C is a section diagram cutaway view, in accordance with one embodiment.

FIG. 3A is a side view of a partially deployed section, in accordance with one embodiment. Referring to FIG. 3A, in one embodiment, section 308 is a section located either at or near a luggage loading door or an aircraft, or alternatively at a position deepest in the aircraft, and will have a second section (not shown) attached thereto at a connection portion 322. Connection portion 322 includes, in various embodiments such as a straight bar coupling two adjacent sections together, a roller supporting structure securing adjacent rollers of adjacent sections together, or any other means known to those of ordinary skill having the benefit of this disclosure. Thus, roller 319 is a powered roller of an adjacent section. More understanding of the operation and structure of section 308 may be gained with a discussion of FIGS. 5A through 5D.

FIGS. 5A through 5D are snapshots of an animation reflecting the process of deploying the foldable conveyer system, in accordance with one embodiment. Referring to FIGS. 5A through 5D, conveyer system 502 includes a first section 504 including left side 506 and right side 508. First section 504 is shown, in FIG. 5A, in a mostly folded/stored position, for example, at an angle of less than 90 degrees to each other in a side view, and the deployment process for that section has just begun. Note that a second section 510 is coupled to first section 504, and second section 510 is fully deployed. For purposes of this disclosure, fully deployed is considered to be a condition where the half sections, such as left side 506 and right side 508, when viewed on a side form an angle greater than 175 degrees. In configurations where left and right half-sections, such as left side 506 and right side 508, when viewed on a side, have an angle less than a predetermined angle, for example, 175 degrees between them, a limit switch terminates power to any powered rollers within either or both half sections of that section, thus stopping powered movement associated with the respective conveyer belts of those left side and right side half-sections. More particularly, the limit switch operates, in various embodiments, at folding positions where the sections when viewed on a side have an angle less than one or more of 100, 110, 120, 130, 140, 150, 160 and 170 degrees, or any degree measure between 100 and 175 degrees. Handle 519 of section 510 is representative of handles on each section which assist in the folding and deployment processes.

Items 517, 516 and 518 are equivalent to items 340, 322 and 319 (of FIG. 3A) respectively.

Figure 5A:
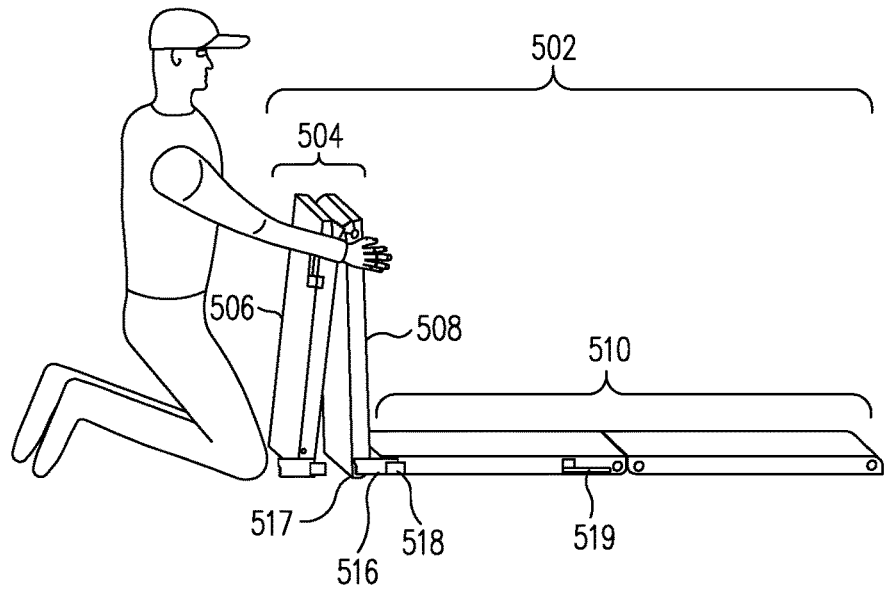
FIGS. 5A through 5D are snapshots of an animation reflecting the process of deploying the foldable conveyer system, in accordance with one embodiment.
Figure 5B:
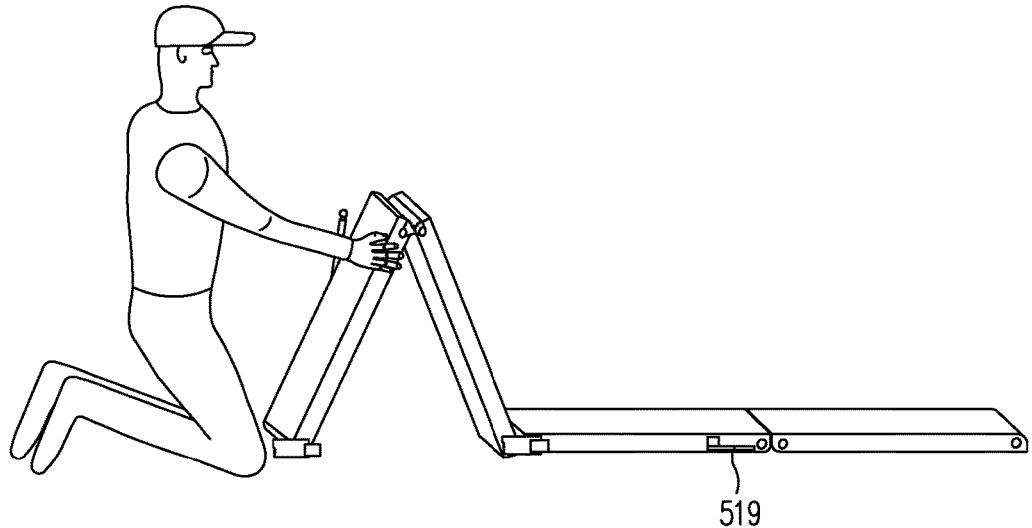
Figure 5C:
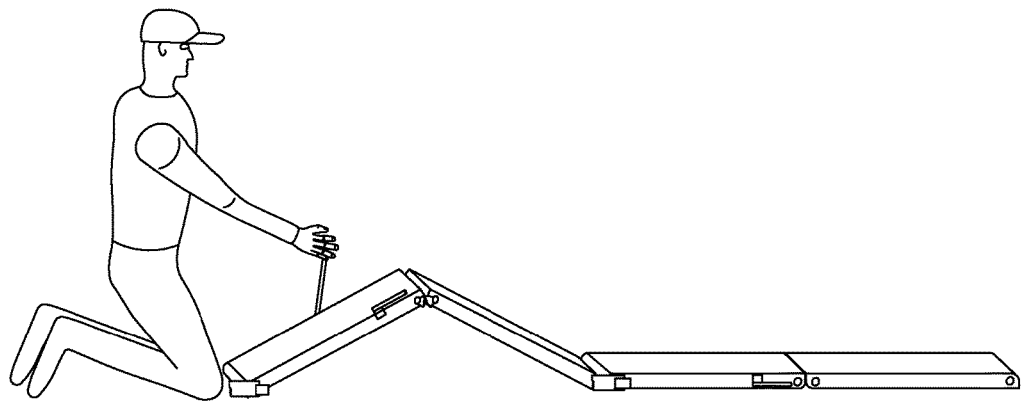
Figure 5D:
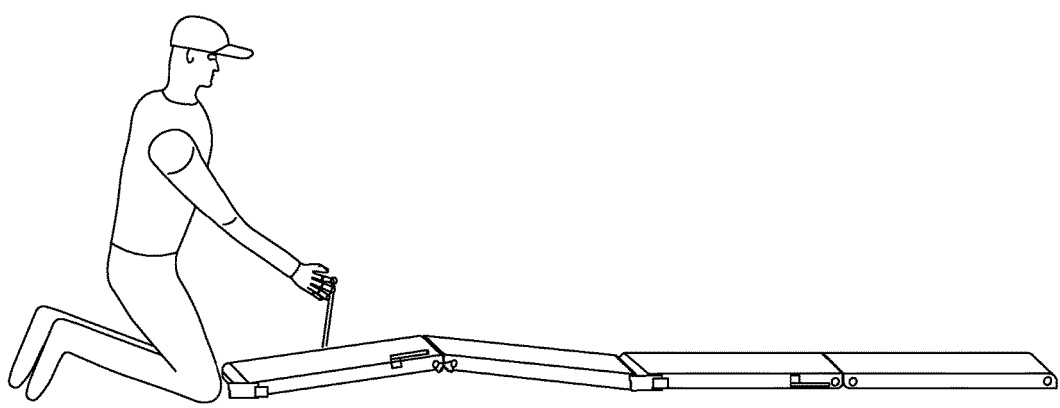

Referring to FIGS. 5B, 5C and 5D, FIG. 5B reflects a slightly more deployed position than FIG. 5A reflects. Correspondingly, FIG. 5C reflects a slightly more deployed position than FIG. 5B reflects, and FIG. 5D reflects a slightly more deployed position than FIG. 5C reflects.

Referring again to FIG. 3A, switch 325 is a main power switch which controls power between a power source, such as a battery, a primary power cord that can be plugged into aircraft, or other power sources, and one or more powered rollers of one or more sections discussed herein. Switch 325 may include wireless controller functionality which switches power to one or more sections on or off depending on the characteristics of data received from a remote controller. Further, Switch 325 may be configured to control power to multiple sections. Thus, if a system includes three sections, each section comprising first and second half sections, one power switches is configured to control power to two or more sections.

Handle 308 is coupled through a bar to friction end 335 so that when handle 308 is operated, friction end 335 locks a wheel 340 in place so that the section is drawn upward and the folded/deployed status of adjacent sections are not affected by the folding of the current section. Direction-controlling switch assembly 331 allows an operator to control the direction of rotation of the powered and idler rollers, thus controlling the direction of associated conveyer belts of the various half-sections, such as left side 202 and right side 210 (FIG. 2A) of conveyer system 100 (FIG. 1).

FIG. 3B is a detail view of a portion of FIG. 3A, in accordance with one embodiment. Shown herein is a detail drawing of the timing gear and its operation to ensure that both halves of a given section being folded or deployed share equal halves of the movement. Also shown in FIG. 3B is an approximate location of a limit switch that reduces or eliminates power available to the powered rollers when the section is in a partial or completely folded state.

FIG. 4A is a view of a one half of a partially folded section standing vertically, in accordance with one embodiment.

FIG. 4B is a side cutaway view, in accordance with one embodiment.

FIG. 4C is a detail diagram of a subset of 4B.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A foldable conveyer system comprising:
    a luggage moving component, formed of a first half section and a second half section, the first half section and the second half sections each being rectangularly formed, at least the first half section having a conveyer belt that runs along a long side of a rectangle associated with its rectangular formation, the conveyer belt being frictionally coupled to a powered roller at a powered roller end of the first half section and to a second end of the first half section, the second end of the first half section comprising a powered roller, a powered roller being a roller having electrical power supplied thereto and powering the movement of the conveyer belt according to a setting of a direction-controlling switch;
    the first half section being foldably coupled at a first end through a hinging mechanism to a first end of the second half section.

2. The foldable conveyer system of claim 1 further comprising:
    wherein the second half section comprises at least one powered roller.

3. The foldable conveyer system of claim 1 further comprising:
    wherein the second half section comprises at least one powered roller and at least one nonpowered roller.

4. The foldable conveyer system of claim 1 further comprising:
    wherein the second half section comprises at least one nonpowered roller.

5. The foldable conveyer system of claim 1 further comprising:
wherein the second half section comprises a plurality of nonpowered rollers configured to assist in the moving of the luggage from one side of that half section to the other side of that half-section.

6. The foldable conveyer system of claim 1 further comprising:
a first section and a second section, each being formed of respective luggage moving components, the first and second sections being rectangularly formed and coupled together such that the first and second sections fold up accordion style.

7. The foldable conveyer system of claim 6 further comprising:
the first half section being foldably coupled at a first coupling end through a hinging mechanism to a first coupling end of the second half section, a second coupling end of the second half section of the first section being foldably coupled to a second coupling end of a first half of the second section.

8. The foldable conveyer system of claim 1 further comprising:
at least one half section of at least the first half section including a limit switch that terminates power to at least one powered roller of that half section when the half section is folded within a predetermined angle with respect to an adjacent half section.

9. The foldable conveyer system of claim 8 further comprising:
wherein the predetermined angle is equal to or between 100 and 179 degrees.

10. The foldable conveyer system of claim 9 further comprising:
wherein the predetermined angle is equal to or between 150 and 175 degrees.

11. The foldable conveyer system of claim 1 further comprising:
a power component configured to provide power to powered rollers of one or more luggage moving components, the power component being switchable on or off through the engagement of a switch mechanism.

12. The foldable conveyer system of claim 11 further wherein the power component comprises at least one battery.

13. The foldable conveyer system of claim 11 further wherein the power component comprises a power connector configured to provide aircraft power to the one or more luggage components.

14. A method for loading an aircraft with luggage comprising:
providing a luggage moving component formed of a first half section and a second half section, the first half section and the second half sections each being rectangularly formed, at least the first half section having a conveyer belt that runs along a long side of a rectangle associated with its rectangular formation, the conveyer belt being frictionally coupled to a powered roller at a powered roller end of the first half section and to a second end of the first half section, the second end of the first half section comprising a powered roller, the first half section being foldably coupled at a first end through a hinging mechanism to a first end of the second half section, the luggage component being provided in a folded stowed configuration, a powered roller being a roller having electrical power supplied thereto and powering the movement of the conveyer belt according to a setting of a direction-controlling switch;
positioning the luggage moving component within a luggage storage area of an aircraft;
unfolding the luggage moving component by rotating the first half section about an axis of the hinging mechanism at the first end thus increasing an angle between the first half section and the second half section beyond an angle of 90 degrees;
placing at least one piece of luggage on the luggage moving component thus causing the at least one piece of luggage to move from a point of placement to a far end of the luggage moving component at least partially due to the rotation of the conveyor belt of the first half section.

15. The method of claim 14 further comprising:
wherein the second half section comprises at least one powered roller and at least one nonpowered roller.

16. The method of claim 14 further comprising:
wherein the second half section comprises a plurality of nonpowered rollers configured to assist in the moving of the luggage from one side of that half section to the other side of that half-section further wherein placing at least one piece of luggage on the luggage moving component includes placing the at least one piece of luggage on the first half section thus causing the placed at least one piece of luggage to move from the first half section to the second half section.

17. The method of claim 14 further comprising:
a first section and a second section, each being formed of respective luggage moving components, the first and second sections being rectangularly formed and coupled together such that the first and second sections fold up accordion style to form a stowed configuration, and unfold to form an operational configuration, wherein placing at least one piece of luggage on the luggage moving component includes placing the at least one piece of luggage on the first half section of the first section thus causing the placed at least one piece of luggage to move from the first half section of the first section to the second section.

18. The method of claim 14 further comprising:
at least one half section of at least the first half section including a limit switch that terminates power to at least one powered roller of that half section when the half section is folded within a predetermined angle with respect to an adjacent half section, further wherein when unfolding the luggage moving component by rotating the first half section about an axis of the hinging mechanism at the first end thus increasing an angle between the first half section and the second half section beyond an angle of 90 degrees, the luggage moving component is unfolded to an angle between the first half section and the second half section beyond the predetermined angle thus causing power to be applied to at least one powered roller.

* * * * *